United States Patent Office 2,793,199
Patented May 21, 1957

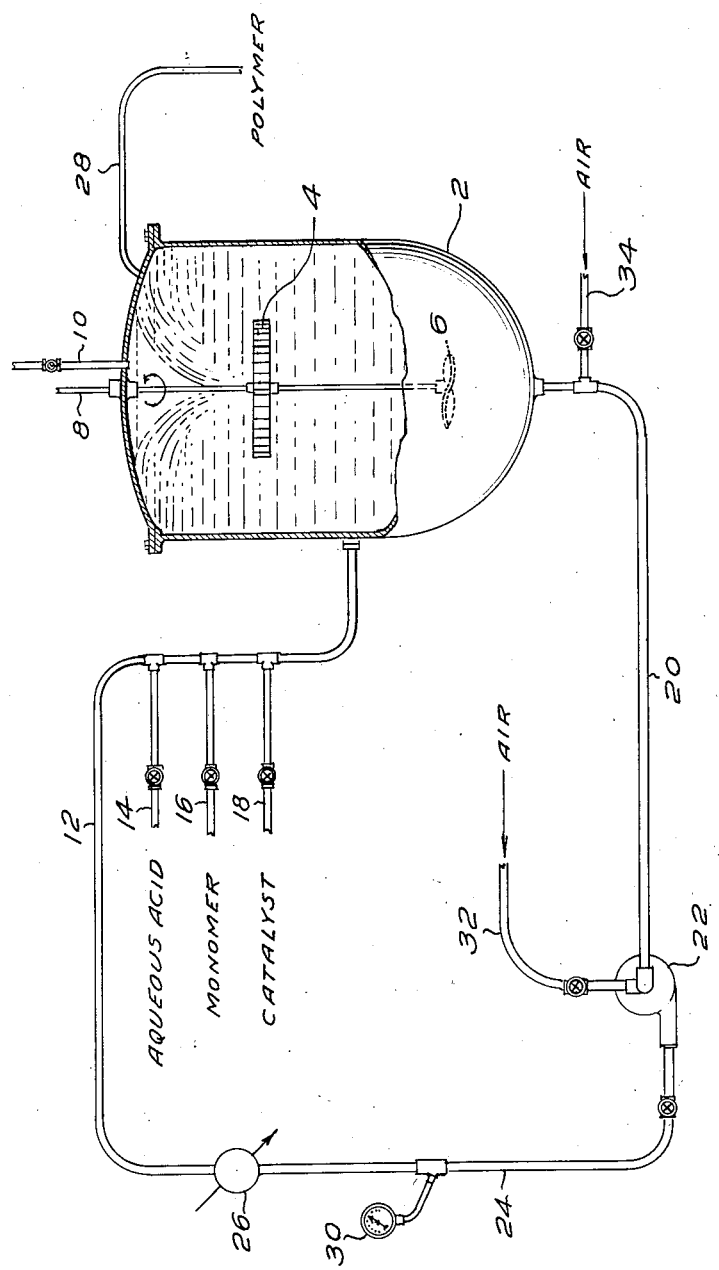

2,793,199

ACRYLONITRILE POLYMERIZATION

Kerwin K. Kurtz, Stamford, Conn., assignor to American Cyanamid Company, New York, N. Y., a corporation of Maine Application October 8, 1952, Serial No. 313,690

8 Claims. (Cl. 260—85.5)

The present invention relates to a process and system for the polymerization of resin-forming material containing a terminal unsaturated group. More particularly it is concerned with inhibiting the deposition of polymeric material, especially polyacrylonitrile, in a zone of the polymerization system.

The polymerization of vinyl type compounds, that is compounds containing at least one $CH_2=C<$ radical, are exothermic reactions. In maintaining good control of the reaction conditions it is necessary to cool the reaction mixture and this is usually accomplished in a continuous process by recirculating the reaction mixture through heat exchangers cooled by water. With substances which deposit solid polymeric material on the walls of the equipment, considerable difficulty has been experienced in keeping the walls of the heat exchanger tubes clean enough to maintain accurate temperature control inasmuch as such polymers have poor heat transfer characteristics and because the deposits often are of substantial thickness. This scaling or "plating" of the heat exchanger not only wastes a good deal of cooling water through inefficient heat transfer but eventually results in losing control of the temperature of the reaction. Another effect of the scaling is the substantial increase in power required for circulating the liquid or slurry through the more restricted passages. To correct these conditions it is necessary to shut down equipment and laboriously clean out the layer of polymer by hand, by dissolving it in a suitable solvent or by other suitable chemical treatment. These shut downs, of course, reduce the overall production efficiency of the process. Further, the operation of the equipment is more difficult since it is always more troublesome to establish uniform process conditions while starting up such apparatus than merely to maintain steady state conditions. Of the various substances derived from the unsaturated monomers mentioned, polymeric acrylonitrile, which expression is used herein to denote homopolymers and coolymers of acrylonitrile, is of especial interest since it is constantly increasing in importance in the production of synthetic fibers and soil conditioners. These acrylonitrile polymers in aqueous suspension or slurry tend to form on the walls of heat exchange equipment a coating of a nature which is quite difficult to remove. Of course, deposits are also found on the walls of other vessels and equipment in the polymerization systems, but these are less troublesome than those occurring in the pipes of relatively small diameter and in heat exchange zones of limited cross-section.

An object of the invention is to minimize the deposition of solid polymeric material in certain regions of polymerization systems.

A second object of the invention is to minimize the deposition of solid polymeric material on the walls of heat exchange equipment employed in the continuous polymerization of acrylonitrile polymers.

Various other objects and advantages of the present invention will become apparent to those skilled in the art from the accompanying detailed description and disclosure.

The disadvantages mentioned above are eliminated or at least minimized and the stated objects are obtained by the present invention which comprises a process and system for polymerizing a resin-forming material containing a $CH_2=C<$ group chiefly in one zone of the system while simultaneously inhibiting the deposition of polymeric solids in another zone by the introduction of oxygen, nitrous oxide or nitric oxide. Oxygen is, of course, the preferred inhibiting gas by reason of its ready availability in the form of air. The gases mentioned may be used either undiluted or in admixture with one or more compatible gases, that is any gases which do not react with or counteract the effect of the inhibiting gas. Although the invention is primarily designed for continuous polymerizations, it may be employed with batch polymerization processes if desired. Currently, the production of polymeric acrylonitrile appears to be the most important application of the present invention.

In the attached drawing, the figure is a flow sheet of a continuous system for the polymerization of compounds containing a terminal unsaturated radical.

Reaction vessel 2 is provided with a turbine wheel 4 and propeller 6 both mounted on the same agitator shaft 8 which is rotated by a prime mover (not shown). This reactor has a capacity of 60 gallons and is operated in a completely full condition except for the vortex in the upper center created by the agitation. This empty space is kept filled with nitrogen or another inert gas which is slowly bled into the vessel from the valve-controlled line 10.

The feed is made up of three streams of liquid. One, entering line 12 from pipe 14, consists of 126 pounds per hour of an aqueous acid reaction medium which contains 0.35% $H_2SO_4$, 5 parts per million of ferrous iron added as ferrous sulfate and the balance demineralized water. Line 16 introduces 60 pounds per hour of monomeric acrylonitrile of 3.4% moisture content by weight. The third stream is 10 pounds per hour of a deionized water solution of a redox catalyst containing 0.282 pound of sodium chlorate and 1.00 pound of anhydrous sodium sulfite flowing into pipe 12 from line 18. This feed stock along with recirculated reaction slurry is introduced into the reaction vessel 2 by pipe 12.

As is typical of vinyl polymerizations, the reaction is exothermic. In order to maintain the reaction temperature at 40° C. the reaction mixture is circulated through line 20, pump 22, line 24 and cooler 26 at a rate of 120 gallons per minute. The cooled reaction mixture is returned to the reaction kettle via line 12 along with the feed as described previously. The slurried product overflows through line 28 at a rate equal to the feed rate and is stored in storage tanks (not shown) until it can be centrifuged to separate the solids. Although most of the polymerization takes place in the system shown during the residence time of two hours, a small amount of unreacted feed is present in the slurry coming over through line 28; hence a small amount of polymerization takes place in the storage tanks where the residence time is relatively unlimited.

Of the polymerization reaction in the recycling system described, the predominant part, say 90% or more, of the polymer formation and development occurs in the reactor 2 rather than the recirculating branch which includes the heat exchanger 26 and associated pipes carrying the slurry. This results from the much greater volume and consequently residence time in the reactor for the reactants in comparison with the heat exchanger and lines.

The heat exchanger 26 is made up of three 8-foot lengths of water-jacketed 1½ inch schedule 10 pipe having an internal diameter of 1.682 inches. To avoid or minimize corrosion all of the apparatus mentioned should be made of stainless steel or other corrosion resistant materials. In operating this system at a circulation rate of 120 gallons per minute the velocity of the reaction slurry through the cooler tubes is 1038 feet per minute which appears to be within the turbulent flow range. The scaling of the heat exchanger has proven to be the limiting factor as to the length of run which could be made with this system; hence minimizing the polymer deposits here serves to greatly increase production capacity and reduce labor costs. Pressure gauge 30 serves to check the performance of pump 22.

It was discovered that the admission of air or oxygen in very small quantities had a profound effect on the deposition of polymeric material in the cooler without any other substantial effect on the system as a whole. Although the air may be bled into the system through line 32 at the pump inlet, it is preferred to locate an air line 34 close to the point at which line 20 leaves reactor 2 in order that the tendency of the polymer to plate line 20 may also be avoided. The effect of the oxygen or air in inhibiting deposition of polymer from the slurry onto metal and other surfaces is not wholly understood at present. For example, it appears that the deposition is inhibited to a lesser degree in the case of rubber hoses under similar operating conditions.

The treatment described herein is applicable to the emulsion or solution polymerization of any resin forming or polymerizable substance having a terminal unsaturated group, $CH_2=C<$, which undergoes addition polymerization to form a linear polymer. Such compounds may also be described as those having a terminal ethylenic group either substituted or unsubstituted. This includes compounds with a vinylidene radical therein as well as the more important vinyl compounds and derivatives. Illustrative examples of such monomers are vinyl halides such as vinyl chloride, vinyl bromide or vinyl fluoride; vinyl esters such as vinyl acetate, vinyl chloroacetate, vinyl propionate, vinyl butyrate, and others; vinyl ethers such as vinyl methyl ether, vinyl isobutyl ether, vinyl 2-chloroethyl ether, and others; vinyl ketones such as vinyl methyl ketone, vinyl hexyl ketone, vinyl isopropenyl ketone, and others; ethylene, isobutylene; styrene, and substituted styrenes including methyl styrene, the dimethyl styrenes, hydroxy styrene and p-chlorostyrene; acrylonitrile, esters of alpha-methylene aliphatic monocarboxylic acids such as methyl acrylate, ethyl acrylate, n-butyl acrylate, isobutyl acrylate, dodecyl acrylate, 2-chloroethyl acrylate, 2-chloropropyl acrylate, 2,2'-dichloro-isopropyl acrylate, phenyl acrylate, cyclohexyl acrylate, methyl alpha-chloro acrylate, methyl methacrylate, ethyl methacrylate, methyl ethacrylate, and others; vinylidene halides such as vinylidene chloride, vinylidene chlorofluoride; N-vinyl compounds such as N-vinyl pyridine, N-vinyl pyrrole, N-vinyl carbazole, N-vinyl indole, N-vinyl succinimide, and others; butadiene-1,3; chloroprene; diallyl maleate; and other similar polymerizable materials. The method of this invention is also applicable to the polymerization of mixtures of two or more of these monomeric materials including other compounds containing a single olefinic bond such as the alkyl esters of maleic and fumaric acids.

Suitable catalysts for such reactions are well-known to those skilled in the art and form no part of the present invention; hence they will not be described in details. For the polymerization of acrylonitrile homo- or copolymers, redox or reduction-oxidation catalyst systems are preferred, especially those disclosed in U. S. Patent No. 2,751,374 by Arthur Cresswell. The optimum temperatures for such reactions are also a matter of common knowledge to the workers in the art and need not be specified here.

To obtain the desired inhibition of polymer plating in the cooling zone, air should be admitted at a rate sufficient to supply between about 0.005 and about 0.05 cubic feet of dry oxygen per pound of dry resin-forming material in the feed and the preferred proportions of oxygen range from about 0.001 to 0.020 cubic feet on the same basis. The same quantities are used in the case of nitrous oxide and nitric oxide. All gaseous volumes are set forth herein in terms of standard cubic feet, that is cubic feet of dry gas measured at 60° F. and 760 mm. of mercury absolute pressure. Although air is the preferred source of oxygen it is, of course, obvious that equivalent quantities of enriched air or pure oxygen may be employed if desired. Similarly, it is contemplated that any other materials which liberate or release oxygen, nitrous oxide or nitric oxide under the polymerization reaction conditions and which are compatible with the reaction mixtures may also be employed. Accordingly, it is intended that the term "oxygen," "nitrous oxide" and "nitric oxide" shall be broadly construed in the specification and claims to cover such equivalents as well as mixtures of one or more said gases with diluents or other compatible substances.

Rapid circulation with turbulent flow through the cooler is recommended. It apears that better results are obtained by a fine dispersion of the air or other gas in the slurry, and a turbulent flow of the reaction mixture produces this fine dispersal of air throughout the stream of slurry. Further, it appears that polymer deposition is reduced by increasing the agitation or turbulence in the slurry. However, it is not feasible to pump the reaction mixture through the heat exchanger at a rate fast enough to reduce the polymer deposition to the degree obtainable by treatment with a suitable gas.

For a fuller understanding of the nature and object of the invention reference should be had to the following examples which illustrate the invention. All parts are given in terms of weight unless otherwise stated.

COMPARATIVE EXAMPLE A

The system is operated to polymerize a monomer consisting of 95% acrylonitrile and 5% methylacrylate by weight along with the moisture content indicated. No air is bled into the recirculating system and it is necessary to shut down the operation after 40 hours due to the inability to maintain control of the reaction temperature even by pumping continually increasing and excessive quantities of water to cooler 26. The heat exchanger tubes are found to have a layer about 0.050 inch thick of solid acrylonitrile copolymer therein.

COMPARATIVE EXAMPLE B

Comparative Example A is repeated except that nitrogen at a rate of 1 cubic foot per hour is introduced into pump 22 through line 32. After operating 40 hours it is again necessary to shut down the system and a similar deposit of acrylonitrile copolymer is found in the heat exchanger pipes.

*Example I*

Comparative Example A is repeated under essentially the same conditions except that 1 cubic foot of air per hour is admitted to the inlet of pump 22 through line 32. After the equipment is on the stream for 221 hours the interior of the heat exchanger tubes are inspected and found to be very clean. Beyond reducing the molecular weight of the polymer by about 3% no other effect of the air upon the reaction is noted. This minor reduction in molecular weight is considered trivial inasmuch as it is readily eliminated by the minor adjustment of reaction conditions in a manner known to those skilled in the art.

*Example II*

Another run is made under substantially the same conditions as in Example I for a longer period. After operating for 636 hours it is necessary to shut down the apparatus in order to remove the heavy coatings of acrylonitrile copolymer from the reactor and also the inlet of the pump. The layer of polymer scale in the reactor ranges from ⅛ to as much as 1¼ inches in thickness.

The polymerization reaction is started again and continued for an additional 460 hours. Although the heat exchanger tubes are not examined, no difficulty with this unit is experienced over the entire period of 1096 hours during which it is not cleaned. At no time is control of the reaction temperature lost even though the quantity of water required to cool exchanger 26 increase somewhat.

*Example III*

Example I is repeated without any substantial alterations for a period of 477 hours. As in Examples I and II, the system is shut down for reasons unconnected with the performance of the heat exchanger. Upon inspecting the apparatus it is noted that the plating of polymer in the reactor, which varies somewhat, averages about ½ inch in thickness. The scale in 2-inch pipe 20 is of the same thickness, whereas the heat exchanger tubes through which the air-treated reaction slurry flows have a deposit of polymer estimated at approximately 0.02 inch thick which did not reduce the heat transfer sufficiently to render temperature control difficult.

are 507 and 667 ft./min. respectively, and 887 and 1168 ft./min. respectively at 28 gal./min. Oxygen in the form of air is admitted at a controlled rate through line 34 which joins line 20 near the outlet from reactor 2. The catalyst and monomer feeds are substantially the same in proportion to reactor volume as in Example I except for varying the quantity of water and the residence time. The data on these examples is set forth in the table below. Although no effort is made to determine the maximum possible length of run, still the runs are of long enough duration to demonstrate the plating or scaling characteristics of the particular conditions in the heat exchanger. The polymer slurry overflowing through line 28 is run into storage tanks (not shown) for a period sufficient for the maximum polymer yield under the circumstances before the polymer is centrifuged, washed and blended.

| Ex. | Oxygen, cu. ft./lb. Monomer | Av. Residence Time, hrs. | | Circulation Rate, gal./min. | pH | Weight Percent Monomer in Feed | Polymer Deposits in Cooler |
|---|---|---|---|---|---|---|---|
| | | Reactor | Storage | | | | |
| IX | 0.0113 | 2.90 | 2.45 | 28 | 2.2 | 25 | negligible. |
| X | 0.0022 | 1.86 | 1.93 | 28 | 1.5 | 33 | Do. |
| XI | 0.0113 | 2.94 | 2.47 | 16 | 2.1 | 25 | Do. |
| XII | 0.0022 | 1.84 | 1.92 | 16 | 1.6 | 33 | Do. |

*Example IV*

Example I is repeated substituting one cubic foot of nitrous oxide per hour for the air admitted through line 32. Again no difficulty is encountered due to the deposition of polymeric material in the heat exchanger or the return line.

*Example V*

Example I is repeated using one cubic foot per hour of nitric oxide in place of the air introduced through line 32. Once more the amount of polymer deposited in the tubes of heat exchanger 26 is of a minor nature.

*Example VI*

Example I is repeated substituting a resin-forming material containing the usual amount of water and containing 90% acrylonitrile and 10% methyl acrylate as the active ingredients. No difficulties are encountered as the result of scale formation in the heat exchanger.

*Example VII*

Example I is duplicated again in all essential respects except that the resin-forming material contains 90% acrylonitrile and 10% β-hydroxy ethyl methacrylate as the active substance along with the usual amount of moisture. No significant deposition of solids is found in the cooler tubes.

*Example VIII*

Example I is duplicated in all respects except substituting an acrylonitrile feed for the comonomer feed. No appreciable difference is noted in respect to polymer deposition in the heat exchanger.

Examples IX to XII inclusive are carried out in a smaller but generally similar apparatus to that used for Examples I to VIII. The reactor volume is 16.3 gallons and the heat exchanger 26 consists of 4 three-foot lengths of water-jacketed pipes arranged in series. Two of these have an internal diameter of 0.880 inch while the other two are of 0.767 inch I. D. The pump is driven at two different speeds for various runs in order to provide different circulation rates; however the speed is held constant during each individual run. At 16 gallons per minute the flow rates in the wide and narrow tubes of the cooler While there are above disclosed a number of embodiments of the process and system of the invention herein presented, it is possible to produce still other embodiments without departing from the concept herein disclosed, and it is desired therefore that only such limitations be imposed on the appended claims as are stated therein or required by the prior art.

I claim:

1. A continuous process which comprises feeding a resin-forming material containing at least 85% by weight of acrylonitrile into a reaction zone of a closed polymerization system, polymerizing in aqueous dispersion the resin-forming material chiefly in the reaction zone, withdrawing a stream of the reaction mixture from the reaction zone, introducing between about 0.0005 and about 0.05 cubic foot of a gas of the group consisting of oxygen, nitrous oxide and nitric oxide into said stream per pound of resin-forming material in the feed on a dry basis, passing the gas-treated stream through a cooling zone, returning the cooled stream to the reaction zone and withdrawing a second stream of the reaction mixture from the reaction zone as the product of the process, whereby the deposition of polymeric solids on the metallic walls of the cooling zone is minimized.

2. A continuous process which comprises feeding a resin-forming material containing a

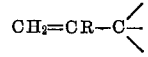

radical wherein R is of the group consisting of hydrogen and a methyl radical into a reaction zone of a closed polymerization system, polymerizing in aqueous dispersion the resin-forming material chiefly in the reaction zone, withdrawing a stream of the reaction mixture from the reaction zone, introducing between about 0.0005 and about 0.05 cubic foot of oxygen into said stream per pound of resin-forming material in the feed on a dry basis, passing the oxygen-treated stream through a cooling zone, returning the cooled stream to the reaction zone and withdrawing a second stream of the reaction mixture from the reaction zone as the product of the process, whereby the deposition of polymeric solids on the metallic walls of the cooling zone is minimized.

3. A continuous process which comprises feeding a resin-forming material comprising at least 85% by weight of acrylonitrile into a reaction zone of a closed polymerization system, polymerizing in aqueous dispersion the resin-forming material chiefly in the reaction zone, withdrawing a stream of the reaction mixture from the reaction zone, introducing between about 0.0005 and about 0.05 cubic foot of oxygen into said stream per pound of resin-forming material in the feed on a dry basis, passing the oxygen-treated stream through a cooling zone and returning the cooled stream to the reaction zone, whereby the deposition of polymeric solids on the walls of the cooling zone is minimized.

4. A continuous process which comprises feeding a resin-forming material comprising at least 85% of acrylonitrile into a reaction zone of a closed polymerization system, polymerizing in aqueous dispersion the resin-forming material chiefly in the reaction zone, withdrawing a stream of the reaction mixture from the reaction zone, introducing between about 0.001 and about 0.02 cubic foot of oxygen into said stream per pound of resin-forming material in the feed on a dry basis, passing the oxygen-treated stream through a cooling zone, returning the cooled stream to the reaction zone and withdrawing a second stream of the reaction mixture from the reaction zone as the product of the process, whereby the deposition of polymeric solids on metallic walls of the cooling zone is minimized.

5. A process according to claim 4 in which said aqueous dispersion contains a reduction-oxidation catalyst system comprising a chlorate ion and a sulfoxy reducing ion in an acidic aqueous solution.

6. A continuous process which comprises feeding a resin-forming material containing a

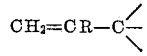

radical wherein R is of the group consisting of hydrogen and a methyl radical into a reaction zone of a closed polymerization system, polymerizing in aqueous dispersion the resin-forming material chiefly in the reaction zone, withdrawing a stream of the reaction mixture from the reaction zone, introducing between about 0.0005 and about 0.05 cubic foot of a gas of the group consisting of oxygen, nitrous oxide and nitric oxide into said stream per pound of resin-forming material in the feed on a dry basis, passing the gas-treated stream through a cooling zone and returning the cooled stream to the reaction zone, whereby the deposition of polymeric solids on a wall of the cooling zone is minimized.

7. A process according to claim 6 in which the resin-forming material comprises acrylonitrile.

8. A process according to claim 6 in which said aqueous dispersion contains a reduction-oxidation catalyst system comprising a chlorate ion and a sulfoxy reducing ion in an acidic aqueous solution.

References Cited in the file of this patent

UNITED STATES PATENTS

| | | |
|---|---|---|
| 2,498,226 | Sully | Feb. 21, 1950 |
| 2,504,488 | Antonio et al. | Apr. 18, 1950 |

OTHER REFERENCES

Bacon: Trans. Faraday Soc., vol. 42, pages 140–155 (1946).